T. J. FEGLEY.
TAP WRENCH.
APPLICATION FILED DEC. 6, 1913.
1,132,319.
Patented Mar. 16, 1915.
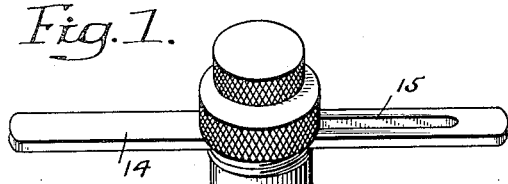
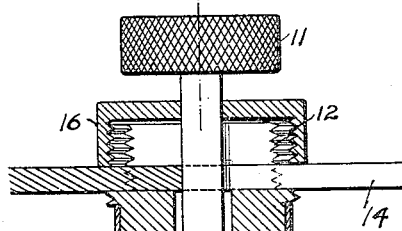
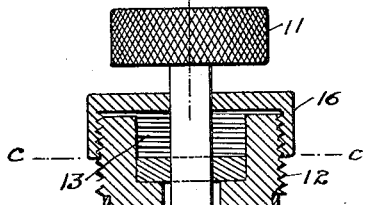
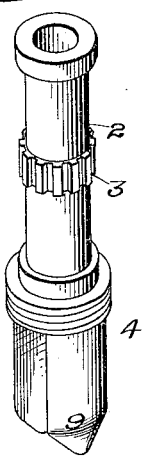
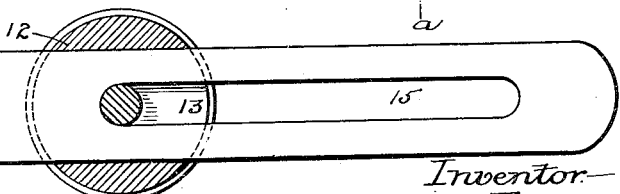
Witnesses
Will A. Burrows
William T. Nase
Inventor
Thomas J. Fegley
by his Attorneys
Howson & Howson

UNITED STATES PATENT OFFICE.

THOMAS J. FEGLEY, OF PHILADELPHIA, PENNSYLVANIA, ASSIGNOR TO NORTH BRO'S M'F'G CO., OF PHILADELPHIA, PENNSYLVANIA, A CORPORATION OF PENNSYLVANIA.

TAP-WRENCH.

1,132,319. Specification of Letters Patent. Patented Mar. 16, 1915.

Application filed December 6, 1913. Serial No. 804,995.

*To all whom it may concern:*

Be it known that I, THOMAS J. FEGLEY, a citizen of the United States, residing in Philadelphia, Pennsylvania, have invented certain Improvements in Tap-Wrenches, of which the following is a specification.

The object of my invention is to make a simple and substantial ratchet tap wrench, in which the handle can be shifted to increase the leverage when necessary.

In the accompanying drawing:—Figure 1, is a perspective view of my improved tap wrench; Fig. 2, is a longitudinal sectional view on the line $a$—$a$, Fig. 3; Fig. 3, is a longitudinal sectional view on the line $b$—$b$, Fig. 2; Fig. 4, is a sectional plan view on the line $c$—$c$, Fig. 3; and Fig. 5, is a detached perspective view of the spindle.

1 is the body of the wrench in which is located a hollow spindle 2 having ratchet teeth 3. This spindle has a head 4 bearing against the end of the body 1, and this head is screw threaded to receive the threaded shell 5 of the chuck, which is stationary in respect to said spindle. The jaws 6 of the chuck have tapered outer surfaces fitting against the tapered portion of the shell of the chuck and are carried by a block 7 connected thereto by springs 8, preferably of the form shown. I lay no claim to this particular form of chuck in the present case, as any form of chuck may be used in carrying out my invention. The block 7 and the jaws 6 are adapted to guides 9 which project beyond the head 4 of the spindle 2.

The interior of the spindle 2 is threaded to receive a threaded stem 10, one end of this stem bears against the block 7 and the other end projects through the end of the tap wrench and is provided with a hand-wheel 11. This stem is turned to open or close the jaws.

On the end of the body 1 opposite the chuck is an enlarged portion 12 having an external screw thread, and in this portion is a transverse slot 13 for the reception of the handle 14. This handle is slotted as at 15 for the passage of the spindle 10.

16 is a cap having an external thread adapted to the threads of the enlarged portion 12 of the body, and this cap is for the purpose of retaining the handle 14 in any position to which it is adjusted. When extra leverage is desired, the handle can be moved to one side to any distance and locked by the cap 16.

In order to ratchet the tap either to the right or left, or to lock the spindle while the jaws of the chuck are being actuated, I provide a ratchet mechanism such as that illustrated in Patent #1,022,311, April 2, 1912, which is constructed as follows:—Two pawls 17 and 18 are pivoted to the body portion 1 and have projections which enter the recesses 19 in the body portion, and these pawls engage the ratchet teeth 3 on the spindle 2. Projecting through a slot 20 in a casing 21, which incloses the body portion, is a shifter 22 carrying a spring 23 which bears upon the pawls 17, 18, and the spring is of such a length that when the shifter is in the mid-position, as shown in Fig. 3, both pawls engage the ratchet teeth 3 of the spindle 2 and lock the spindle from turning in either direction and, when in this position, the jaws of the chuck can be moved by turning the stem 10.

By moving the shifter 22 toward the chuck then the spring 23 moves past the pivot point of the pawl 18 and lifts the pawl out of engagement with the ratchet teeth 3, the pawl 17 still remaining in position. Thus the tool will ratchet in one direction. By moving the shifter 22 to the extreme opposite position, the pawl 17 is thrown out of engagement with the ratchet teeth, the pawl 18 is held in engagement and the tool can be ratcheted in the opposite direction.

Tap wrenches need not necessarily be provided with ratchet mechanism, but when it is desired to tap into corners, or other inaccessible places where it is impossible to make a full turn of the wrench, then a ratchet tap wrench is desirable.

Heretofore these ratchet tap wrenches have been made comparatively light and they will not withstand the pressure when there is considerable leverage exerted on the tool, but in a tap wrench of the construction illustrated, using a broad and substantial ratchet wheel, which is an integral part of the spindle, increased leverage can be used without crushing the pawls or stripping the teeth, and the handle can be adjusted so that it will project at one side only of the wrench to increase the leverage and allow it to be used in a place where the ordinary fixed handle could not be used.

While I have shown a two jaw chuck, it will be understood that a three jaw chuck may be used without departing from the essential features of the invention.

I claim:—

1. The combination in a tap wrench, of a body portion; an elongated spindle having ratchet teeth at or about the center thereof and having a screw threaded head; integral guides projecting beyond the head; jaws in the space between the guides; a threaded tapered shell secured to the threaded head of the body portion and bearing upon the jaws, the spindle having an opening throughout its length; a screw thread cut in the walls of the opening; and a threaded stem extending through the body portion and the spindle and adapted to the threads in the walls of the opening in said spindle and acting to project the jaws.

2. The combination of a body portion having a slotted end; a thread on the slotted end; a slotted handle mounted in the slot of the body portion; a screw cap for confining the handle in the position to which it is adjusted; a hollow threaded spindle mounted in the body portion; a threaded stem adapted to the threads of the spindle extending through the slot in the handle and having a hand-wheel thereon; a chuck shell secured to the lower portion of the spindle; jaws mounted in the shell and actuated by the stem, said spindle having ratchet teeth on its periphery; pivoted pawls carried by the body; means for shifting the pawls; and a casing inclosing the body portion and slotted to allow for the projection of the shifting mechanism.

In testimony whereof, I have signed my name to this specification, in the presence of two subscribing witnesses.

THOMAS J. FEGLEY.

Witnesses:
  Jos. H. KLEIN,
  WM. A. BARR.

Copies of this patent may be obtained for five cents each, by addressing the "Commissioner of Patents, Washington, D. C."